(12) United States Patent
Xing (10) Patent No.: US 11,395,049 B2
(45) Date of Patent: Jul. 19, 2022

(54) METHOD AND DEVICE FOR CONTENT RECORDING AND STREAMING

(71) Applicant: NORTHWEST INSTRUMENT INC., Dover, NJ (US)

(72) Inventor: David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 16/998,579

(22) Filed: Aug. 20, 2020

(65) Prior Publication Data

US 2021/0306719 A1     Sep. 30, 2021

Related U.S. Application Data

(60) Provisional application No. 63/002,604, filed on Mar. 31, 2020.

(51) Int. Cl.

| *H04N 7/10* | (2006.01) |
|---|---|
| *H04N 7/025* | (2006.01) |
| *H04N 21/81* | (2011.01) |
| *H04N 21/2187* | (2011.01) |
| *H04N 21/45* | (2011.01) |
| *H04N 21/488* | (2011.01) |

(52) U.S. Cl.
CPC ..... *H04N 21/8126* (2013.01); *H04N 21/2187* (2013.01); *H04N 21/4532* (2013.01); *H04N 21/4886* (2013.01); *H04N 21/8146* (2013.01); *H04N 21/4882* (2013.01)

(58) Field of Classification Search
CPC .......... H04N 21/8126; H04N 21/2187; H04N 21/4532; H04N 21/4886; H04N 21/8146; H04N 21/4882
See application file for complete search history.

(56) References Cited

U.S. PATENT DOCUMENTS

| 2011/0164163 A1* | 7/2011 | Bilbrey | G06F 1/1694 |
| | | | 348/333.01 |
| 2014/0344661 A1* | 11/2014 | Sipe | G06F 16/435 |
| | | | 715/230 |
| 2017/0034237 A1* | 2/2017 | Silver | H04N 5/272 |

(Continued)

FOREIGN PATENT DOCUMENTS

GB     2505978 A     3/2014

OTHER PUBLICATIONS

European Patent Office European Search Report for Application No. 20213548.9 dated Oct. 1, 2021 8 pages.

*Primary Examiner* — Kyu Chae
(74) *Attorney, Agent, or Firm* — Anova Law Group, PLLC (57) ABSTRACT

A content recording and sharing method is applied to a computing device. The method includes: obtaining a video in real time, the video capturing a physical scene for a time duration; generating supplemental contents synchronized with the video; receiving user information from a first user terminal device; determining first selected supplemental content according to the user information and a first selection rule, and sending the first selected supplemental content to the first user terminal device; determining second selected supplemental content according to a second selection rule; and sharing the video and the second selected supplemental content with one or more second user terminal devices.

20 Claims, 4 Drawing Sheets

(56) References Cited

U.S. PATENT DOCUMENTS

| | | | |
|---|---|---|---|
| 2017/0336441 A1* | 11/2017 | Hosein | G06Q 30/06 |
| 2017/0366557 A1* | 12/2017 | Schaer | H04W 12/06 |
| 2018/0374267 A1 | 12/2018 | Yurkin | |
| 2018/0374268 A1 | 12/2018 | Niles | |
| 2019/0082196 A1* | 3/2019 | Kedenburg, III | H04N 21/23418 |
| 2019/0104235 A1 | 4/2019 | Sarkar | |
| 2020/0267349 A1* | 8/2020 | Garrido | G06K 9/00255 |

\* cited by examiner

METHOD AND DEVICE FOR CONTENT RECORDING AND STREAMING

CROSS-REFERENCE TO RELATED APPLICATION

This application claims the priority of U.S. Provisional Patent Application No. 63/002,604, titled "Method and Device for Content Recording and Streaming", filed on Mar. 31, 2020, the entire contents of which are incorporated herein by reference.

TECHNICAL FIELD

The present disclosure generally relates to audio and video processing technology and augmented reality (AR) technology, and in particular, to systems, methods, and devices for recording and streaming content.

BACKGROUND

Video and audio recording and streaming of live scenes are becoming a key attraction for users of computing devices. For instance, more and more users are enjoying the benefits of creating videos at live events, such as sports events and live performances, and sharing the recorded video with an audience either in real time or after the event.

Currently, a participant or an event personnel may use a mobile device, such as a smart phone or a tablet, or a digital video (DV) recorder to record live videos. However, these devices in general only record real scenes in the physical environment. Due to development of wireless technology, live event organizers may deliver additional contents to the on-site audiences, such as real-time prompt information or interactive information between performers and audiences. In particular, the development of augmented reality (AR) technology may allow stage performers to add real-time special effects or interactive information in a digital format. When the on-site audiences want to record live scenes for sharing, they may either record real-scene videos of the live event, or they may record video frames capturing all the information, including the additional contents, blended together in the video frames. They cannot selectively remove certain contents that they do not wish to display during sharing or stored playback. This limitation may negatively affect user experience of such a recording systems. In addition, for the event organizers, they may not wish to share certain information to outside viewers who are not a participant or attendee of the event. For example, they may wish to exclude certain on-site prompt or interactive information from videos shared to public audiences. The current recording systems do not provide selective recording of real-scenes and supplemental contents, and do not allow streaming systems to selectively broadcast or display the recorded contents. The present disclosure in part aims to address the limitations in the existing systems.

SUMMARY

In one aspect, the present disclosure provides a content recording and sharing method. The method may be applied to a computing device, and includes: obtaining a video in real time, the video capturing a physical scene for a time duration; generating supplemental contents synchronized with the video; receiving user information from a first user terminal device; determining first selected supplemental content according to the user information and a first selection rule, and sending the first selected supplemental content to the first user terminal device; determining second selected supplemental content according to a second selection rule; and sharing the video and the second selected supplemental content with one or more second user terminal devices.

In certain embodiments, the method further includes controlling a video camera to capture the video.

In certain embodiments, the user information indicates that the first user terminal device is associated with an on-site participant of an event associated with the physical scene in the time duration; and the first selected supplemental content includes content that is not included in the second supplemental content.

In certain embodiments, the user information includes one or more of: a user ID; user credential data; user location data; owner data of the user terminal device; and user preference data.

In certain embodiments, the supplemental contents include one or more of: information related to a content of the video; information related to a target object in the video; a special effect; one or more user feedback; a notification from a physical environment; and navigation information.

In certain embodiments, the supplemental contents include one or more of a text, an image, an audio signal, an image, and an animation.

In certain embodiments, the method further includes: after receiving the user information from the user terminal device, determining a user category according to the user information, and determining the first selected supplemental content according to the user category.

In certain embodiments, the method further includes: after receiving the user information from the user terminal device, determining a user location according to the user information, and determining the first selected supplemental content according to the user location.

In certain embodiments, the user information includes a current location associated with the user terminal device; and the first selected supplemental content includes navigation information guiding a user from the current location to a designated seating location for the user.

In another aspect, the present disclosure provides another content recording and sharing method. The method may be applied to a user terminal device, and includes: displaying a video in an interface of the user terminal device in real time, the video capturing a physical scene for a time duration; receiving supplemental contents from a server in real time; displaying the supplemental contents superimposed on the video in the interface; storing the video and the supplemental contents; determining selected supplemental content for sharing according to a selection rule; and uploading the video and the selected supplemental content to a video sharing platform.

In certain embodiments, displaying the video in the interface is initiated in response to receiving a first user instruction; storing the video and the supplemental contents is initiated in response to receiving a second user instruction; and uploading the video and the selected supplemental content is initiated in response to receiving a third user instruction.

In certain embodiments, the selected supplemental content is a subset of the supplemental contents.

In certain embodiments, displaying the supplemental contents superimposed on the video in the interface includes displaying the supplemental contents according to a first user configuration.

In certain embodiments, storing the video and the supplemental contents includes storing the video and the supplemental contents in synchronization according to a second user configuration.

In certain embodiments, uploading the video and the selected supplemental content includes uploading the video and the selected supplemental content according to a third user configuration.

In certain embodiments, the method further includes: before receiving the supplemental contents from the server, sending user information to the server.

In another aspect of the present disclosure, a device for performing content recording and sharing is provided. The device includes: a non-transitory computer-readable storage medium storing a plurality of computer-executable instructions; and a processor, coupled with the non-transitory computer-readable storage medium and, when executing the computer-executable instructions, configured to: obtain a video in real time, the video capturing a physical scene for a time duration; generate supplemental contents synchronized with the video; receive user information from a first user terminal device; determine first selected supplemental content according to the user information and a first selection rule, and sending the first selected supplemental content to the first user terminal device; determine second selected supplemental content according to a second selection rule; and share the video and the second selected supplemental content with one or more second user terminal devices.

In certain embodiments, the processor is further configured to: after receiving the user information from the user terminal device, determine a user category according to the user information, and determine the first selected supplemental content according to the user category.

In certain embodiments, the processor is further configured to: after receiving the user information from the user terminal device, determine a user location according to the user information, and determine the first selected supplemental content according to the user location.

In certain embodiments, the processor is further configured to upload the video superimposed with the second selected supplemental content in real time to a video hosting platform to cause the video hosting platform live broadcasting of the video superimposed with the second selected supplemental content.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

DETAILED DESCRIPTION

The technical solutions according to the embodiments of the present disclosure are described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

The present disclosure provides a method, a device, and a system for synchronous recording and playback of real scenes and supplemental contents in real time, as well as selectively outputting desired content during recording, playback, and sharing according to targeted audience or system or user configuration. For example, the method, device, and system of the present disclosure may provide the following functions:

1. performing on-site real-time recording of real scenes in a physical environment;

2. superimposing supplemental contents on the videos of real-scene recording, where the supplemental contents may contents such as interactive information, special effects, feedback from online and off-line users including comments, thumbs-up, digital gifts, and so on, and the contents may be in the forms of text, images, videos, audios, animations, and other AR contents;

3. storing, exporting, and replaying the video contents, where during playback, supplemental contents may be selectively superimposed on the real-scene videos;

4. allowing a user to choose a time or a place for recording and playback, and providing different manners for display according to different scenes;

5. providing language support functions such as real-time voice recognition, voice-to-text transcription, voice translation, and so on; and 6. providing supplementary indications and instructions, such as giving directions, providing route navigation, and so on.

Further, according to certain embodiments of the present disclosure, a display terminal for real scene display and playback may be a smart device such as a smart phone, AR glasses, a tablet computer, or a TV or a screen projector, and so on. The system, device, and method can be applied to a wide variety of application scenarios involving live events, such as concerts, lectures, competitions, symposiums, seminars, face-to-face interviews and so on.

Figure 1:
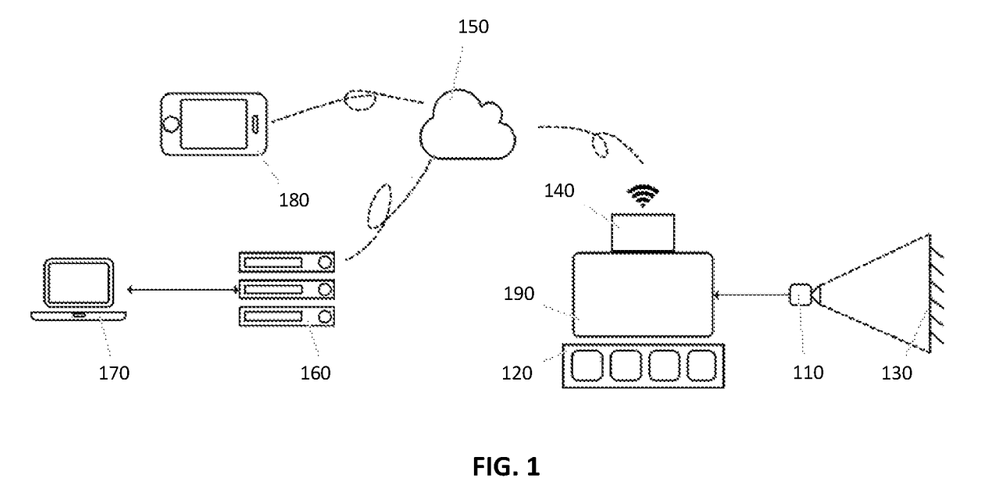
FIG. 1 illustrates an application scenario of the content streaming and recording system according to certain embodiments.

In one aspect of the present disclosure, a content streaming and recording system is provided. FIG. 1 shows an application scenario of the content streaming and recording system 100 according to certain embodiments. As shown in FIG. 1, the content streaming and recording system 100 may include a camera 110, a control interface 120, a wireless communication unit 140, a public network 150, a data server 160, a processing server 170, a user terminal 180, and a display interface 190. The camera 110 may be configured to record videos of a real scene 130 in a physical environment. The real scene 130 may also be termed as a physical scene and it is a scene taking place in the physical environment instead of a computer-generated or a camera-recorded scene. The display interface 190 may be configured to display scenes recorded by the camera 110. The control interface 120 may be configured to receive user inputs. In some embodiments, the control interface 120 may include a physical control panel. In certain other embodiments, the control interface may include a software interface displayed on a screen. The control interface 120 and the display interface 190 may be associated with one or more processors that execute command to operate the control interface 120 and the display interface 190. The control interface 120 and the display interface 190 may communicate with the user terminal through the public network 150. In certain embodiments, the control interface 120 and the display interface 190 may communicate with the data server 160 and the processing server 170 through the public network 150. The data server 160 and the processing server 170 may process the recorded real-scene video and supplemental contents to create a customized AR display. In certain embodiments, the user terminal may employ augmented reality (AR) technology, and display real-time special effects or interactive information in as AR contents.

The control interface 190 may control whether the display interface 190 displays the recorded real-scene videos in real time. It may further control whether to superimpose supplemental contents on the real-scene videos on the display interface 190 in real time. The supplemental contents may include supplemental information of a scene in the real-scene videos (e. g., subtitles). The supplemental contents may also include supplemental information of a target object in the real-scene videos, such as text, images, or animations providing additional information about the target object. Further, the supplemental contents may include notification information from a surrounding environment, such as notification from a theater where the live event takes place. Supplemental information customized to specific audience may also be included, such as multilingual annotations, and feedback from off-site viewers (such as discussions of friends outside the theater about shared videos) may also be included.

The control interface may also control whether to upload and share the recorded live videos and supplemental contents in real time through the wireless communication component 140. The processing server 170 may push supplemental information that matches the current content and the subscribed information that matches a user to the public network 150 through the server 160.

The processing server 170 may receive the recorded real-scene videos as well as the supplemental contents displayed on the on-site display interface with the real-scene videos uploaded and shared by the on-site users in real time from the network 150 through the data server 160. The processing server 170 may further perform secondary processing on the received video data and supplemental contents, and upload the processed contents to the public network 150 through the data server 160.

In certain embodiments, the control interface may control uploading and sharing the recorded live videos and supplemental contents in real time as the contents are being recorded. An off-site viewer may receive real-time contents uploaded and shared by on-site users from on the public network 150 through the user terminal 8, enabling content sharing and discussion. The off-site viewer may also receive real-time contents from the processing server 170 via the public network 150 through the user terminal 8, enabling superimpose display of contents such as commercial promotion while ensuring content privacy and security. In certain other embodiments, the control interface may control storing the recorded live videos and supplemental contents in a memory device, and control uploading and sharing the recorded live videos and supplemental contents after the contents have been recorded.

In certain embodiments, the camera 110, the control interface 120, and the display interface 190 may be included in an electronic device, such as a smart device. A user at the location of a live event may be a member of the on-site audiences. The user may use the smart device to record the event and at the same time use the control interface on the smart device to configure the recording, playback, and sharing the recorded videos. In one example, the user may use the control interface to choose which supplemental contents to superimpose the playback video while recording. In another example, the user may choose which supplemental contents to upload with the recorded real-scene data to a video hosting platform.

In certain embodiments, the camera 110 may be separated from the display interface 190 and the control interface 120. For example, the camera 110 may be a DV camcorder operated by a photographer. Live video recorded by the DV camcorder may be transmitted to the display interface 190 in real time for playback. The control interface 120 may be operated by an event organizer to generate supplemental contents and to specify which supplemental contents can be shared according to a configuration. The configuration may include different audience categories, for example, on-site audience, VIP audience, and off-site audience. The configuration may further include an index of the supplemental contents allowed to be shared with a corresponding group. For example, the event organizer may allow a specific supplemental content to be delivered to the on-site audiences but not allow it to be uploaded to a public video hosting platforms or be shared to outside audiences. Through the control interface 120, the event organizer may further selectively deliver the supplemental contents to a specific audience based on audience information such as audience category, audience location, audience request, and so on. Certain audience information may be acquired through wirelessly communicating with an application installed on a user mobile device. For example, the control interface 120 may communicate with the user mobile device and receive a location of an event attendee from the user mobile device. Once the location of the event attendee is determined, the control interface 120 may select supplemental contents to deliver to the user mobile device, such as AR superimpose on the recorded videos to provide direction and navigation information, location-specific special effects, and so on.

Figure 2:
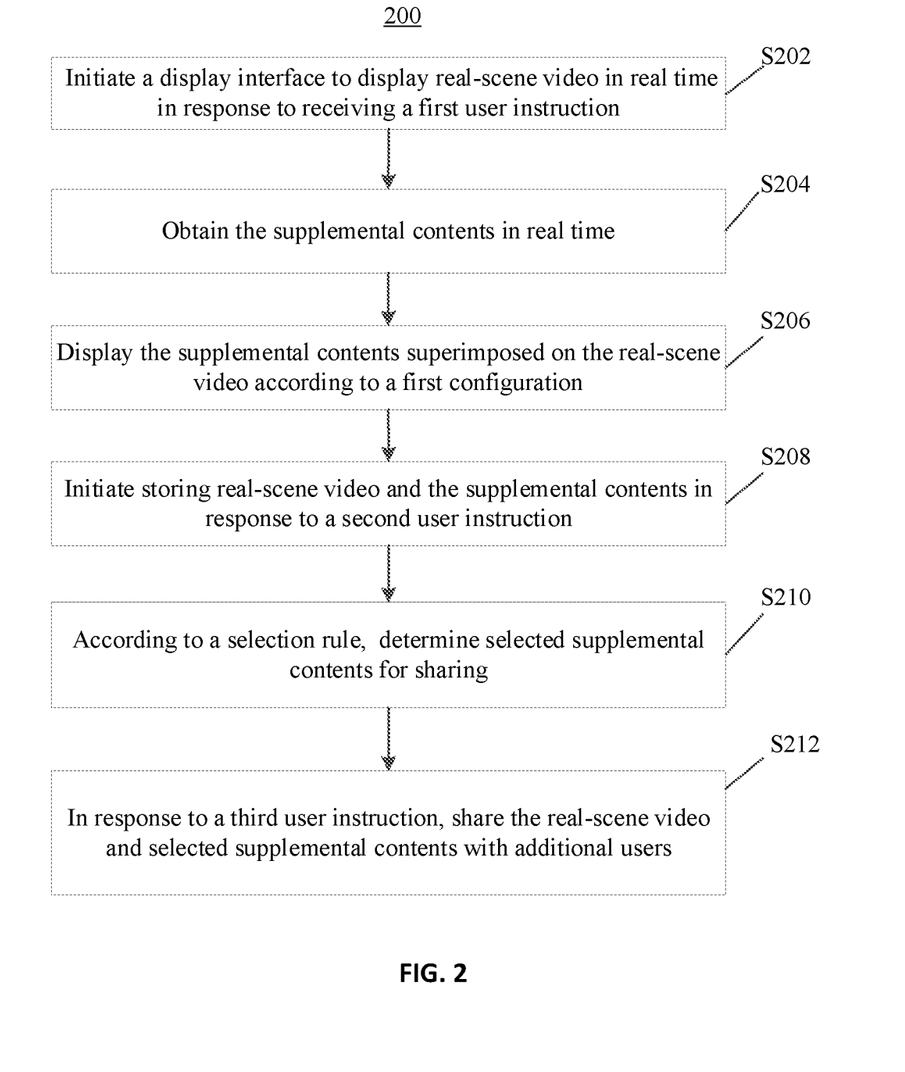
FIG. 2 illustrates a content recording and sharing method according to certain embodiments.

In an aspect of the present disclosure, a content recording and sharing method is provided. FIG. 2 illustrates the content recording and sharing method 200 according to certain embodiments. The method may be implemented by a user terminal device. In certain embodiments, the user terminal device may be a mobile device used by a user who is an on-site participant or an on-site audience of a live event. In certain embodiments, the user terminal may employ augmented reality (AR) technology, and configured to display real-time special effects or interactive information in as AR contents. The user terminal device may have a display interface to display contents, an interactive interface for receiving user instructions, a communication unit to receive and send data via a network, and processor that executes computer program instructions to control operations of the display interface, the input interface, and communication unit. In certain embodiments, the user terminal device may further include a camera configured to record real-scene videos and a memory to store data. As shown in FIG. 2, the content recording and sharing method may include the following steps.

Step S202 is to initiate a display interface to display real-scene video in real time in response to receiving a first user instruction. The real-scene video is a video capturing a physical scene taking place in a physical environment. By contrast, the real-scene video is not a computer-generated display or a video recording of a computer-generated or recorded display. In certain embodiments, the user terminal device may receive a user instruction through the interactive interface to start displaying real-scene videos on the display interface. In one example, an on-site participant or audience may use the camera of the user terminal device to capture real scenes at an event location. The captured real scene may be displayed on the display interface of the user terminal device. In another example, the user terminal device may receive real-scene video data from another camera at the event location, and display the video since on the display interface in real time.

Step S204 is to obtain the supplemental contents in real time. In certain embodiments, the supplemental contents may be received from a server in real time. For example, the event organizer may create supplemental contents synchronized with the real-scene videos to better inform the audience or to enhance their experience. The user terminal device may receive these supplemental contents. The supplemental contents may include supplemental information of a scene in the real-scene videos (e. g., subtitles). The supplemental contents may also include supplemental information of a target object in the real-scene videos, such as text, images, or animations providing additional information about the target object. Further, the supplemental contents may include notification information from a surrounding environment, such as notification from a theater or other types of venue where the live event takes place. For example, a theater where the event is taking place may send the seating information to the audience in real time, and may notify the audience the starting time, the finishing time, and/or the progress of the performance. In other examples, the venue may use the supplemental contents to timely broadcast emergency information to the on-site audience, including, for example, occurrence or forecast of a natural disaster warnings. Further, in other examples, the supplemental contents may be used to notify off-site information to the audience in real time, such as traffic and weather conditions, or to provide assistance information such as real-time taxi service information. Supplemental information customized to specific audience may also be included, such as multilingual annotations. Feedback from on-site and off-site viewers (such as discussions of friends outside the theater about shared videos) may also be included in the supplemental information. In certain embodiments, the user terminal device may provide a user ID and credential data to the server, so that the server may authorize the user terminal device to receive certain supplemental contents. In certain embodiments, the user terminal device may provide additional information to the server, such as location data, owner data, user subscription and preference, and so on, so that the server may tailor supplemental contents provided to that specific user terminal device. In certain embodiments, the user may configure one or more of the owner data, user subscription data, and user preference data on the user terminal device. In certain embodiments, the sever may determine a user category according to one or more of the user ID, user credential data, location data, owner data, user subscription data, and user preference data, and determine which supplemental contents to be delivered to the specific user terminal device. For example, one or more of the user ID, user credential data, and user location data, and/or owner data may indicate that the user is a ticketed on-site participant, and the server may accordingly authorize the user to receive certain supplemental contents that are not available to a user not being an on-site participant. In another example, one or more of the user ID, user credential data, and user location data, and/or owner data may indicate that the user is a VIP on-site participant, and the server may accordingly authorize the user to receive additional supplemental contents. In another example, the server may use the location data to determine certain supplemental contents containing a visual effect specifically designed for a viewing angle corresponding to the user location, and deliver the supplemental contents containing the special visual effect to the user terminal device, so the special visual effect may be displayed superimposing the real-scene video on the user terminal device. In yet another example, the server may use the location data and one or more of the user ID and/or credential data to determine certain supplemental contents containing navigation information for guiding the user from the current location to a designated seating location of the user, and deliver the supplemental contents containing the navigation information to the user terminal device to help guiding the user to find the designated seating location.

Step S206 is to display the supplemental contents superimposed on the real-scene video in the display interface according to a first configuration. In certain embodiments, the user terminal device may superimpose received supplemental contents to the real-scene video. The user terminal device may selectively display certain supplemental information, and display the selected supplemental information in a certain manner, according to a first configuration. In certain embodiments, the user terminal device may store configuration information, such as selection of a language, or whether to display a certain category of supplemental information. Certain configuration information may be entered by the user through a user interface. Certain other configuration information may be configured at the time when a software application corresponding to the display interface is installed on the user terminal device, or when the display interface is initiated. The configuration information may include the first configuration. In certain embodiments, the user may change the first configuration according to user need or preference.

Step S208 is to initiate storing real-scene video and the supplemental contents in response to a second user instruction. In certain embodiments, the user may choose to store the real-scene video as well as the supplemental contents for later playback or sharing. In certain embodiments, the real-scene video and the supplemental contents may be stored in a same file with time information, so that they can be synchronized at playback. In certain other embodiments, the real-scene video and the supplemental contents may be stored in separate files, each having time information or synchronization information. In certain embodiments, the real-scene video and the supplemental contents may be stored according to a second user configuration in addition to the user instruction. The second user configuration may also be stored on the user terminal device and may be changed by the user. For example, the second user configuration may be used to specify video storage format, resolution, compression, as well as types of supplemental information to be stored. In certain embodiments, the second user configuration may be configured or edited by the event organizer, and the user terminal device may receive the configuration information from the server in real time. For example, the event organizer may allow a specific supplemental content to be delivered to the on-site audiences for viewing but not allow it to be stored to the user terminal device.

Step S210 is to determine selected supplemental contents for sharing according to a selection rule. The method in the present disclosure provides flexibility of sharing only selected supplemental contents to a specific group of audiences. For example, off-site viewers may not access certain supplemental contents due to the event organizer's preference or data security and privacy. In certain embodiments, an on-site user may choose to share the event video with outside viewers, and a subset of the supplemental contents the on-site user receives may be selected to share with the outside viewers along with the real-scene videos. The selection may be made according to a selection rule. In certain embodiments, the selection rule may be pre-configured, for example, as pre-configured parameters of a software application running on the user terminal device. In certain embodiments, the selection rule may also be made or edited in real time by the event organizer, and the user terminal device may receive the selection rule from the server in real time. For example, the event organizer may allow a specific supplemental content to be delivered to the on-site audiences but not allow it to be uploaded to a public video hosting platforms or be shared to outside viewers. In certain other embodiments, the on-site user may edit certain aspect of the selection rule using the interactive interface of the user terminal device. For example, the on-site user may choose to share or not to share a specific supplemental content with a specific group of off-site viewers.

S212 is to share the real-scene video and selected supplemental contents with additional users according to a third configuration in response to a third user instruction. In certain embodiments, the sharing may be achieved by uploading the real-scene video and selected supplemental contents to a video hosting platform. The real-scene video and selected supplemental contents may be uploaded from the on-site user terminal device to a video hosting platform or a data server in order for other viewers to access them. The process may be conducted according to a third user configuration. In certain embodiments, the selected supplemental contents and the real-scene videos may be processed by the user terminal device to generate superimposed video contents for the sharing. In certain other embodiments, the selected supplemental contents and the real-scene videos may be first sent with their time or synchronization information to a processing server to generate the superimposed video contents.

In certain embodiments, the real-scene video and selected supplemental contents may be uploaded in real time as the contents are being recorded. Thus, an off-site viewer may receive real-time contents uploaded and shared by on-site users from a public network, enabling real time content sharing and discussion. In certain other embodiments, the real-scene video and selected supplemental contents may be uploaded at a later time after the contents have been recorded. Additional post processing and editing may be performed on the stored contents before sharing.

Figure 3:
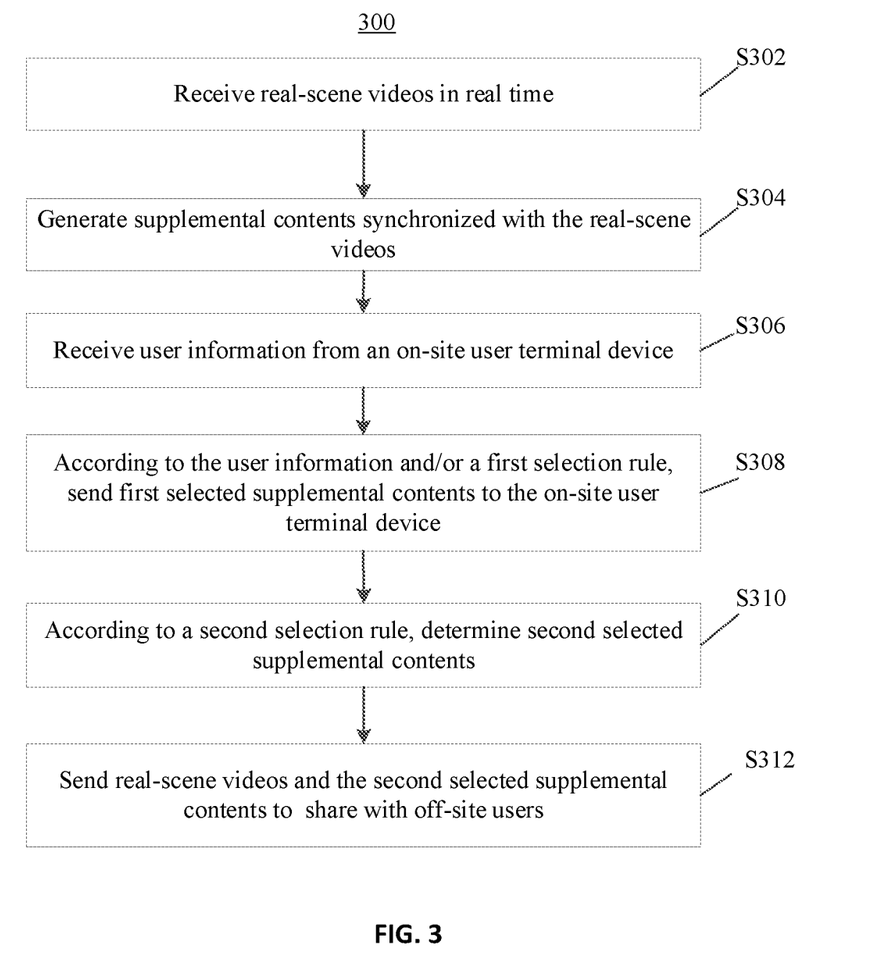
FIG. 3 illustrates a content recording and sharing method according to certain other embodiments.

FIG. 3 illustrates another content recording and sharing method according to certain other embodiments. The method may be implemented by a computing device. In certain embodiments, the computing device may be a server used by an event personnel to provide content and media management for the event. The server may have a display interface to display contents, an interactive interface for receiving user instructions, a communication unit to receive and send data via a network, and processor that executes computer program instructions to control operations of the display interface, the input interface, and communication unit. In certain embodiments, the computing device may communicate with a camera configured to record real-scene videos and a memory to store data. As shown in FIG. 3, the content recording and sharing method 300 may include the following steps.

Step S302 is to receive real-scene videos in real time. In certain embodiments, the computing device may receive video data from a camera, for example, from a DV camcorder that records real-scene videos at an event location. In certain embodiments, the computing device may further control the camera to take real-scene videos while receiving video data from the camera.

Step S304 is to generate supplemental contents synchronized with the real-scene videos. In certain embodiments, the event organizer or personnel may create supplemental contents synchronized with the real-scene videos to better inform the audience or to enhance audience experience. The supplemental contents may include supplemental information of a scene in the real-scene videos (e. g., subtitles). The supplemental contents may also include supplemental information of the physical scene or a target object in the real-scene videos, such as text, audio signal, images, or animations providing additional information about the physical scene or the target object. Further, the supplemental contents may include notification information from a surrounding environment, such as notification from a theater or other types of venue where the live event takes place.

Step S306 is to receive user information from an on-site user terminal device. The method provided by the present disclosure may offer the event organizer the flexibility to deliver supplemental contents customized to specific audience. Thus, in certain embodiments, the computing device may receive user information from a user terminal device. In certain embodiments, the user terminal device may provide user ID and credential data to the computing device, so that the computing device may authorize the user terminal device to receive certain supplemental contents. In certain embodiments, the user terminal device may provide additional information to the computing device, such as location data, owner data, user subscription and preference, and so on, so that the computing device may tailor supplemental contents provided to that specific user terminal device.

Step S308 is to send first selected supplemental contents to the on-site user terminal device according to the user information and/or a first selection rule. In certain embodiments, the computing device may select supplemental contents according to the user information and/or a first selection rule, and send selected supplemental contents to the on-site user terminal, so that an on-site user may view the targeted supplemental contents superimposed on the real-scene video. In certain embodiments, the computing device may determine a user category according to one or more of the user ID, user credential data, location data, owner data, user subscription data, and user reference data, and determine which supplemental contents to be delivered to the specific user terminal device according to the user category. For example, the computing device may determine whether the user terminal device is associated with a user who is a ticketed on-site participant based on one or more of the user ID, user credential data, user location data, and/or owner data, and the computing device may accordingly authorize the user to receive certain supplemental contents that are not available to a user not being an on-site participant. In another example, the computing device may determine whether the user is a VIP participant based on one or more of the user ID, user credential data, and user location data, and/or owner data, and the computing device may accordingly authorize the user to receive additional supplemental contents targeted to VIP participants. In another example, the computing device may use the location data to determine certain supplemental contents containing a visual effect specifically designed for a viewing angle corresponding to the user location, and deliver the supplemental contents containing the special visual effect to the user terminal device, so the special visual effect may be displayed superimposing the real-scene video on the user terminal device. In yet another example, the computing device may use the location data and one or more of the user ID and/or credential data to determine certain supplemental contents containing navigation information for guiding the user from the current location to a designated seating location of the user, and deliver the supplemental contents containing the navigation information to the user terminal device to help guiding the user to find the designated seating location.

Step S310 is to determine second selected supplemental contents according to a second selection rule. The method in the present disclosure provides flexibility of sharing only selected supplemental contents to a specific group of audiences. For example, the event organizer may allow a specific supplemental content to be delivered to the on-site audiences but not allow it to be uploaded to a public video hosting platforms or be shared to outside audiences. For example, off-site audiences may not access certain supplemental contents due to the event organizer's preference or data security and privacy. In certain embodiments, the computing device may configure a selection rule to specify which supplemental contents are to be shared with off-site viewers.

Step S312 is to share real-scene videos and the second selected supplemental contents with off-site viewers. In certain embodiments, the computing device may share the real-scene videos and the second selected supplemental contents with off-site viewers who are not direct participants of the event. In certain embodiments, the computing device may locally process the real-scene videos and the second selected supplemental contents to generate a superimposed video, and upload the superimposed video to a video hosting platform to share with off-site viewers. In certain other embodiments, to save computational resources, the computing device may send the real-scene videos and the second selected supplemental contents to a processing server to cause the processing server to superimpose the real-scene videos with the second selected supplemental contents to share with off-site viewers.

In certain embodiments, the real-scene video and selected supplemental contents may be sent to a processing server in real time as the contents are being recorded. Thus, an off-site viewer may receive real-time contents shared by the processing server from a public network, enabling real time content sharing and discussion. In certain other embodiments, the real-scene video and selected supplemental contents may be sent to the processing server at a later time after the contents have been recorded. Additional post processing and editing may be performed on the stored contents before sharing.

Figure 4:
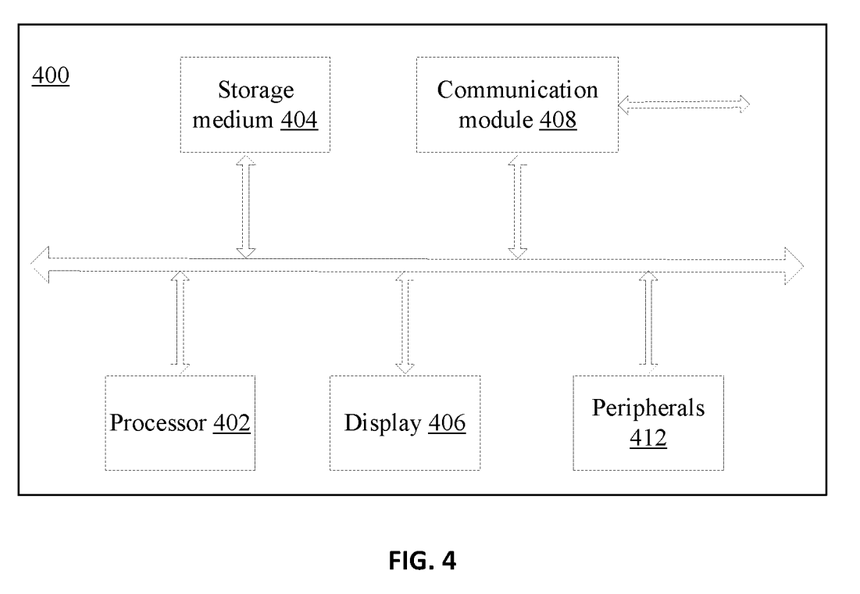
FIG. 4 illustrates a device configuration according to certain embodiments of the present disclosure.

FIG. 4 illustrates a device configuration for the user terminal device for implementing the method of FIG. 2 or the computing device for implementing the method of FIG. 3 according to certain embodiments. As shown in FIG. 4, the device 400 may be a computing device including a processor 402 and a storage medium 404. According to certain embodiments, the device 400 may further include a display 406, a communication module 408, and additional peripheral devices 412. Certain devices may be omitted, and other devices may be included.

Processor 402 may include any appropriate processor(s). In certain embodiments, processor 402 may include multiple cores for multi-thread or parallel processing. Processor 402 may execute sequences of computer program instructions to perform various processes, such as a neural network processing program. Storage medium 404 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 404 may store computer programs for implementing various processes, when executed by processor 402. The communication module 408 may include network devices for establishing connections through a network. Display 406 may include any appropriate type of computer display device or electronic device display (e.g., CRT or LCD based devices, touch screens). Peripherals 412 may include additional I/O devices, such as a keyboard, a mouse, and so on. The processor 402 may be configured to execute instructions stored on the storage medium 404 and perform various operations related to the content recording and sharing method as detailed in FIG. 2 or FIG. 3.

The method and devices provided by the present disclosure may improve interaction efficiency of on-site users. For example, an on-site user may record the live event or performances while watching the event or performances and interacting with off-site users. The method provided by the present disclosure enables the user to obtain supplemental contents according to customization of the user, thus improving user experience. Further, the method and devices provided by the present disclosure may offer improved commercial integration by presenting advertisement or notification in a more targeted and efficient manner.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

What is claimed is:

1. A content recording and sharing method, applied to a computing device, comprising:
   obtaining a video in real time, the video capturing a physical scene for a time duration;
   generating supplemental contents synchronized with the video;
   receiving user information from a first user terminal device;
   determining first selected supplemental content according to the user information and a first selection rule, and sending the first selected supplemental content to the first user terminal device; and
   determining second selected supplemental content according to a second selection rule, and sending the second selected supplemental content to the first user terminal device, wherein the video and the second selected supplemental content is shared by the first user terminal device with one or more second user terminal devices,
   wherein the first supplemental contents include a target supplemental content sent to the first user terminal device, and the target supplemental content is prohibited by an organizer of an event associated with the physical scene from being included in the second supplemental content shared with the one or more second user terminal devices.

2. The method according to claim 1, further comprising: controlling a video camera to capture the video.

3. The method according to claim 1, wherein:
the user information indicates that the first user terminal device is associated with an on-site participant of the event associated with the physical scene in the time duration; and
each of the one or more second user terminal devices is associated with an outside viewer who is not a participant of the event.

4. The method according to claim 1, wherein the user information includes one or more of:
a user ID;
user credential data;
user location data;
owner data of the first user terminal device; and
user preference data.

5. The method according to claim 1, wherein the supplemental contents include one or more of:
information related to a content of the video;
information related to a target object in the video;
a special effect;
one or more user feedback;
a notification from a physical environment; and
navigation information.

6. The method according to claim 1, wherein the supplemental contents include one or more of a text, an image, an audio signal, an image, and an animation.

7. The method according to claim 1, further comprising:
after receiving the user information from the first user terminal device, determining a user category according to the user information, and determining the first selected supplemental content according to the user category.

8. The method according to claim 1, further comprising:
after receiving the user information from the first user terminal device, determining a user location according to the user information, and determining the first selected supplemental content according to the user location.

9. The method according to claim 1, wherein:
the user information includes a current location associated with the first user terminal device; and
the first selected supplemental content includes navigation information guiding a user from the current location to a designated seating location for the user.

10. The method according to claim 1, wherein the first selected supplemental content includes augmented reality (AR) contents customized to the first terminal device, and the AR contents includes special visual effect generated according to a viewing angle corresponding to a user location of the first terminal device.

11. The method according to claim 3, wherein: the video and the second selected supplemental content is shared by the first user terminal device with one or more second user terminal devices after the event.

12. A content recording and sharing method, applied to a user terminal device, comprising:
displaying a video in an interface of the user terminal device in real time, the video capturing a physical scene for a time duration;
obtaining first supplemental contents in real time;
creating an augmented reality (AR) display of displaying the supplemental contents superimposed on the video in the interface, the AR display being customized according to a viewing angle corresponding to the user terminal device;
determining second selected supplemental content for sharing according to a selection rule, wherein the first supplemental contents include a target supplemental content sent to the first user terminal device, and the target supplemental content is prohibited by an organizer of an event associated with the physical scene from being included in the second supplemental content shared with the one or more second user terminal devices; and
sharing the video and the second selected supplemental contents with additional users.

13. The content recording and sharing method according to claim 12, wherein:
obtaining the first supplemental contents in real time includes receiving the first supplemental contents from a server in real time; and
sharing the video and the selected supplemental content with additional users includes uploading the video and the second selected supplemental contents to a video sharing platform.

14. The content recording and sharing method according to claim 12, wherein:
displaying the video in the interface is initiated in response to receiving a first user instruction;
storing the video and the supplemental contents is initiated in response to receiving a second user instruction; and
uploading the video and the second selected supplemental content is initiated in response to receiving a third user instruction.

15. The content recording and sharing method according to claim 12, wherein:
displaying the first supplemental contents superimposed on the video in the interface includes displaying the first supplemental contents according to a first user configuration.

16. The content recording and sharing method according to claim 12, further comprising:
storing the video and the first supplemental contents in synchronization according to a second user configuration.

17. The content recording and sharing method according to claim 12, wherein:
sharing the video and the second selected supplemental contents includes sharing the video and the second selected supplemental contents according to a third user configuration.

18. The content recording and sharing method according to claim 13, further comprising:
before receiving the first supplemental contents from the server, sending user information to the server.

19. The method according to claim 12, wherein the user terminal device is associated with an on-site user, and the method further comprises:
providing an editing interface to determine the selection rule corresponding to a group of off-site viewers to be shared; and
determining the second selected supplemental content according to instructions received from the editing interface.

20. A device for performing content recording and sharing, comprising:
a non-transitory computer-readable storage medium storing a plurality of computer-executable instructions; and
a processor, coupled with the non-transitory computer-readable storage medium and, when executing the computer-executable instructions, configured to:
obtain a video in real time, the video capturing a physical scene for a time duration;

generate supplemental contents synchronized with the video;
receive user information from a first user terminal device;
determine first selected supplemental content according to the user information and a first selection rule, and sending the first selected supplemental content to the first user terminal device; and
determine second selected supplemental content according to a second selection rule; and
send the second selected supplemental content to the first user terminal device, wherein the video and the second selected supplemental content is shared by the first user terminal device with one or more second user terminal devices,
wherein the first supplemental contents include a target supplemental content sent to the first user terminal device, and the target supplemental content is prohibited by an organizer of an event associated with the physical scene from being included in the second supplemental content shared with the one or more second user terminal devices.

\* \* \* \* \*